United States Patent [19]

Pedder et al.

[11] Patent Number: 4,847,500
[45] Date of Patent: Jul. 11, 1989

[54] THERMAL DETECTOR

[75] Inventors: David J. Pedder, Great Rollright; Paul Watson, Little Brington; Richard A. C. Bache, Northampton, all of England

[73] Assignee: Plessey Overseas Limited, Ilford, England

[21] Appl. No.: 925,833

[22] Filed: Sep. 12, 1986

[30] Foreign Application Priority Data

Sep. 12, 1985 [GB] United Kingdom ............... 8522637

[51] Int. Cl.$^4$ ................................. G01J 5/00
[52] U.S. Cl. ..................................... 250/338.3
[58] Field of Search ............... 313/388; 250/330, 332, 250/333, 338, 353, 349, 338.3

[56] References Cited

U.S. PATENT DOCUMENTS

| 3,919,555 | 11/1975 | Singer ................................ 250/332 |
| 4,005,327 | 1/1977 | Roosild et al. ................. 313/388 X |
| 4,039,833 | 8/1977 | Thom .............................. 250/332 |
| 4,053,806 | 10/1977 | Turnbull et al. ............... 250/333 X |
| 4,086,511 | 4/1978 | Redman ......................... 313/388 X |
| 4,180,759 | 12/1979 | Harris et al. .................... 250/333 X |
| 4,290,844 | 9/1981 | Rotolante et al. .............. 250/332 X |
| 4,317,063 | 2/1982 | Pedder et al. ................. 250/333 X |
| 4,360,732 | 11/1982 | Chapman et al. ............... 250/332 |
| 4,386,294 | 5/1983 | Nelson ......................... 250/333 X |
| 4,469,943 | 9/1984 | Turnbull ........................ 250/338.3 |
| 4,536,658 | 8/1985 | Ludington ..................... 250/332 X |
| 4,570,329 | 2/1986 | Paine et al. ................... 250/332 X |
| 4,593,456 | 6/1986 | Cheung ......................... 250/332 X |
| 4,660,066 | 4/1987 | Reid ............................. 250/332 X |
| 4,663,529 | 5/1987 | Jenner et al. .................. 250/332 X |

FOREIGN PATENT DOCUMENTS 2100058A 12/1982 United Kingdom .

Primary Examiner—Thomas H. Tarcza
Assistant Examiner—Mark Hellner
Attorney, Agent, or Firm—Fleit, Jacobson, Cohn, Price, Holman & Stern

[57] ABSTRACT

A thermal detector of the type comprising an array of discrete detector elements each of which is supported by a common supportive layer, each of which is provided in thermal contact with a corresponding collector of radiation absorbent material, the area of each collector being larger than the area of the corresponding detector element, characterized in that contact between each collector and the supportive layer is restricted to an area lying substantially within and displaced from the edge periphery of said collector.

6 Claims, 2 Drawing Sheets

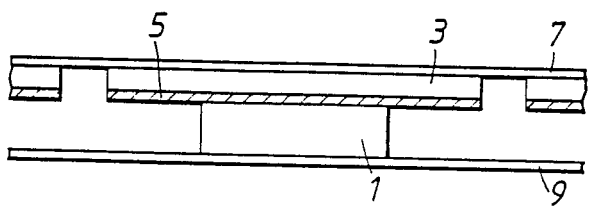
FIG. 1
PRIOR ART
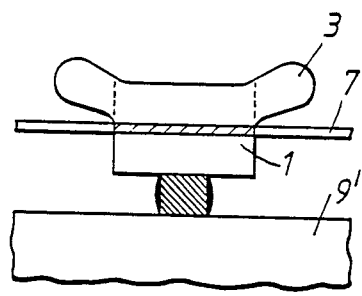
FIG. 2
FIG. 3(a)
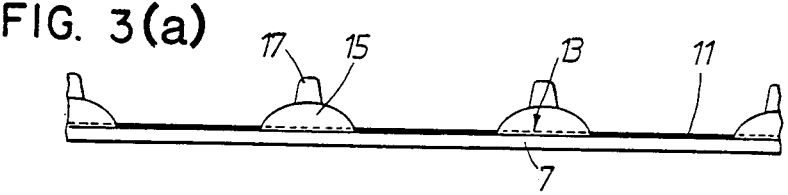
FIG. 3(b)
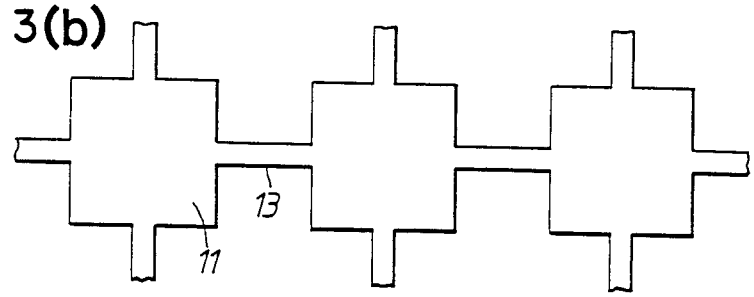

THERMAL DETECTOR

TECHNICAL FIELD

The present invention concerns improvements in or relating to thermal detectors, and more particularly, to thermal infra-red detectors.

In thermal detectors, energy of absorbed radiation raises the temperature of the detecting elements. This increase in temperature causes change in the temperature dependent properties of the detector which may be maintained to detect the incident radiation. The temperature increase may be enhanced by means of structure termed an extended area collector (XAC).

Thermal detectors of interest in the present context include resistance and dielectric bolometer detectors and pyroelectric detectors.

BACKGROUND ART

The structure of an extended area collector according to prior art (eg. see United Kingdom Patent Specification GB 2100058A), is illustrated in FIG. 1.

The structure, as shown, comprises an array of pyroelectric detecting elements 1, each of which is mounted in thermal contact with a corresponding collector 3, formed of thermal absorbing material. Thermal contact is assisted by an intermediary layer 5 of highly conductive material. As shown, these components 1,3 and 5 are retained within supporting layers 7, 9 of thin polymer film. The collector 3 collects and absorbs radiation over an area larger than that of the detector element 1 and transfers the energy absorbed into the thermal detector 1 by thermal conduction. The temperature rise of the detector element 1 is enhanced compared with either a detector element of identical size without a (XAC), or an hybrid composite with a detector element of area equal to that of the XAC, provided that the thermal capacitance of the XAC plus detector structure is lower than that of the detector element above (for either case), assuming that the thermal conduction process is not itself limiting.

In the prior art structure (FIG.1) the thermal conduction path is via a thin metal layer (not shown) of high thermal conductivity (eg. a metal layer of Al, Cu, Ag or Au) that is deposited onto one of the flexible polymer films 7 and 9 that support the detector element 1. The prior art structure is suited to relatively coarse pitch thermal detectors of intermediate performance, albeit it has a performance considerably improved over the equivalent detector without an XAC. However, the prior art structure presents problems at the finest thermal detector pitches and where the highest degree of thermal isolation between adjacent elements and between detector and environment (eg. the silicon readout circuit chip in a thermal detector - silicon hybrid device), is required, since a requirement conflict then arises between thermal radiation collection and thermal isolation. These problems arise because, in the prior art structure, the XAC absorber 3 and the thermal transfer layer 5 are both placed on, and, in contact with, the polymer support film 7 that, while providing mechanical integrity for the structure, also provides a dominant thermal path between the elements 1 and to any adjacent heatsink structures. The degree of thermal isolation of the prior art structure and the extent of thermal cross-talk is controlled by the distance apart of the edges of the collector structure 3, rather than by the separation of the edges of the adjacent detectors 1.

DISCLOSURE OF THE INVENTION

The present invention is intended to provide improved isolation and enhanced collection efficiency, in particular for devices of fine pitch—ie. of order 50 μm pitch or less.

In accordance with the present invention there is provided a thermal detector of the type comprising an array of discrete detector elements each of which is supported by a common supportive layer, each of which is provided in thermal contact with a corresponding collector comprised by radiation absorbent material, the area of each collector being larger than the area of the corresponding detector element, characterised in that contact between each collector and the supportive layer is restricted to an area lying substantially within and displaced from the edge periphery of said collector.

For optimum collection efficiency, it is preferable that the edge to edge separation of adjacent collectors is of dimension less than the wavelength of radiation.

The collector may be formed of metal-black, infrared absorbent material, eg. platinum-black.

The contact area of each collector may match the area of each corresponding element, or, alternatively, it may be of larger area.

BRIEF INTRODUCTION TO THE DRAWINGS

In the drawings accompanying this specification:

FIG. 1 is a cross-section view of a thermal detector including an extended area collector structure of known design;

FIG. 2 is a cross-section view of a thermal detector including an extended area collector structure of design modified in accordance with the present invention;

Figure 4A:
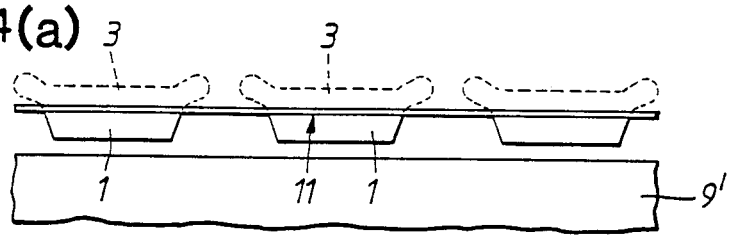
Figure 4B:
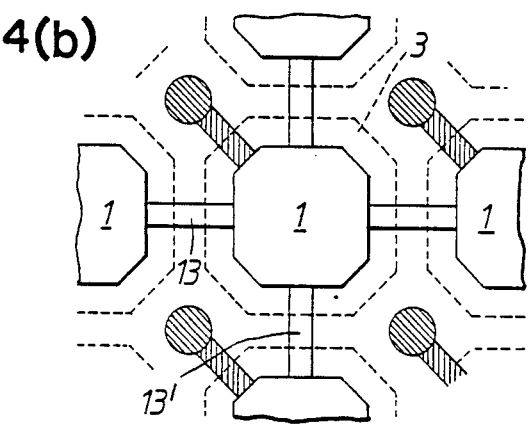
Figure 5:
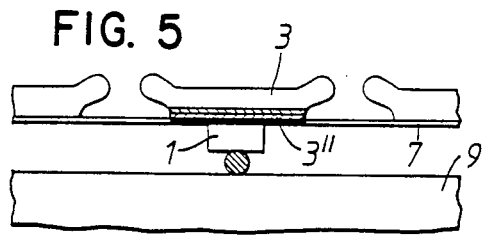

FIGS. 3(a) and (b) shows respectively a cross-section view and plan view of intermediate stages in the fabrication of a detector as shown in FIGS. 4(a) and (b) below;

FIGS. 4(a) and (b) show respectively in cross-section and plan view, a detector designed in accordance with the present invention; and, FIG. 5 shows in cross-section a detector of alternative design, also designed in accordance with the present invention.

DESCRIPTION OF PREFERRED EMBODIMENTS

So that the invention may be better understood, embodiments thereof will now be described, given by way of example only, with reference to the accompanying drawings aforesaid.

There is current interest in achieving thermal detector performance at fine pitch (50 μm pitch) that approaches the fundamental limit for thermal detectors. This limit is determined by the thermal fluctuation noise in the detector which is in turn determined by the total thermal conductance from an element, $G_H$, and the efficiency, $\eta$, of radiation collection and absorption, according to the equation:

$$\text{Thermal fluctuation noise equivalent} = \left(\frac{4KT^2 G_H}{\eta^2}\right)^{\frac{1}{2}}$$

where K is the Boltzmann constant and T is the absolute temperature. In practice the $G_H$ and $\eta$ values are interrelated and an optimum detector area exists for the best combination of thermal isolation and collection efficiency for a conventional detector structure, in which the element area is equal to that of the absorber. Consider a 50 μm pitch thermal detector, such as the pellicle mounted array structure illustrated in bold outline in FIG. 4(a). It is possible to show that the optimum element diameter is approximately 30 microns, for a 5–8 μm thick detector element 1 separated from its neighbour by a 20 μm wide polymer support film 7 of submicron thickness. Such a structure, which has been calculated to provide a $G_H$ of 1 μw. $K^{-1}$, would only possesses a collection and absorption efficiency $\eta$ of about 0.35. Since the fundamental N.E.P. limit is more sensitive to $\eta$ than to $G_H$, an improvement in $\eta$, without reducing $G_H$, is required in order to achieve the particular N.E.P. of interest at the specified optics. Increasing the element size or adding an XAC, of prior art design, thus decreasing the real or effective element separation, rapidly increases the total thermal conductance and degrades the N.E.P. Some gain in effective $\eta$ can be made using a prior art XAC structure in which the detector element size is reduced (for example to 20 μm diameter) while maintaining an XAC structure 30 μm diameter. However it is desirable to devise an XAC structure which would allow radiation to be collected over an area larger than that of the original detector element, to be used alone or in combination with a prior art XAC. The novel design extended area platinum black XAC 3 illustrated in FIG. 2 provides such a structure.

The platinum black XAC (PB-XAC) is a self-supporting, absorbing structure 3 of low thermal capacitance which extends beyond the perimeter of the detector element 1 itself and thus acts as an XAC structure. The significant point to note is that the structure 3 is self-supporting and at its periphery is physically separated from the polymer support film 7 that mechanically and thermally links the detector elements 1. It does not degrade thermal isolation between the elements 1, therefore The platinum black absorbers 3 may be prepared by electro-deposition onto a gold (or platinum) metallised surface (FIG. 3) from an aqueous electrolyte containing chloroplatinic acid and a lead salt, which acts to provide a highly feathery, dendritic growth habit for the deposited layer. Control of the electrolyte composition, temperature, current density and deposition time can be used to produce a low density, dendritic black structure 3 5–7 m in vertical height, with a mass per unit area of about 0.6 mg/cm² (a density of ~5% of theoretical). Such a structure represents a very low thermal mass and is a highly efficient broad band absorber, with an efficiency approaching 100% in the 8–14 m band (for a 300k black body, at 1 km range, for a single bloomed germanium window).

Being produced by a nucleation and growth process, each platinum dendritic is connected electrically and thermally to the plated electrode layer 7. Platinum blacks deposited into defined apertures on a continuous gold film (defined for example using photoresist) or onto a patterned gold film, show significant edge growth. Under the correct black deposition conditions, the height at an edge approaches 1.5 times that on a plane surface, and the black also extends beyond the edge of the apertures by an extent approximately equal to its thickness (the plating process being largely isotropic in nature). This phenomenon can be controlled and exploited to provide an extended area black that is well thermally connected to the area from which it was plated, as illustrated in FIGS. 4(a) and (b).

In producing this structure, gold areas are first patterned as in FIG. 3(b) to provide a series of gold electrodes 11 linked by narrow stripes 13 of gold. A layer of suitable photoresist is applied by spin coating, and is patterned to cover the connecting stripes 13 whilst leaving the gold electrodes 11 exposed. This patterned polymer layer 15 is flow-baked to produce a rounded 'ridge' profile to control the topography of the PB-XAC (FIG. 3(a)). An optional second polymer barrier layer 17 is applied and defined at the centre of each polymer ridge to prevent shorting between adjacent black areas 3. The PB-XAC layer is then applied to give the structure in FIG. 4(a). The polymer layers are removed, and the thin gold connecting stripes 13 etched down to reveal a higher resistivity metal stripe 13'.

Edge extensions in such black structures of up to 10 μm per edge can be achieved by such processes for acceptable black thicknesses. The PB-XAC structure is thus applicable to thermal detector structures where the element pitch is only a small multiple of 10 μm and/or where the inter-element gap is in the 10–30 μm range. Thus for example PB-XAC structures can be defined on 30 μm square gold electrode arrays on a 50 μm pitch (20 μm electrode gap), with an edge extension of 6–8 μm per edge, ie. a gap between adjacent PB-XAC absorbers of between 8 and 4 μm. A 7 μm edge extension would be expected, on the basis of a simple geometrical area calculation, to absorb close to 80% of the pixel radiation (cf 0.35 quoted earlier). Measurements on test structures have shown a total reflectance of 11–12% in the 8–14 μm band, indicating an absorbance close to 90%. This is the result of defining the gap between adjacent elements at or below the wavelength of the incident radiation. Thus the PB-XAC structure can offer close to 90% pixel radiation absorption at 50 μm pitch, without degrading thermal isolation.

The PB-XAC can also be combined with an XAC structure 3″ of prior art design to provide a composite XAC structure that will further enhance thermal detector response, up to a limit defined by the thermal loading effect of the added collector and thermal transfer layer. Such a structure is illustrated in FIG. 5, where it can be seen that part only of the extending area of the collector 3 is detached from the supportive layer 7.

We claim:

1. A thermal detector comprising an array of discrete detector elements, a layer of polymer support film one side of which provides a support for the elements of said array, a collector in thermal contact with each respective detector element, the said collectors being of radiation absorbent material and the surface area of each collector being greater than that of the corresponding detector element, in which the contact between each collector and the polymer layer lies substantially within and is displaced from the edge periphery of said collector.

2. A thermal detector according to claim 1, in which the edge to edge separation of adjacent collectors is of dimension less than the wavelength of radiation.

3. A thermal detector according to claim 1, in which the said collector is formed of a metal-black, infra-red absorbent material, for example platinum black.

4. A thermal detector according to claim 1, in which each said collector includes a contact area, the area of which is equal to or larger than the area of each corresponding detector element.

5. A thermal detector according to claim 1 wherein said collector is formed by an electrodeposit.

6. A thermal detector according to claim 5 wherein said electrodeposit has a low density dendritic structure.

* * * * *